United States Patent
Price et al.

(10) Patent No.: US 8,448,958 B2
(45) Date of Patent: May 28, 2013

(54) COLLAPSIBLE DOLLY

(75) Inventors: Nathan L. Price, Sturgeon Bay, WI (US); James T. Jansen, New Franken, WI (US)

(73) Assignee: Allied Forward Motion LLC, Sturgeon Bay, WI (US)

( * ) Notice: Subject to any disclaimer, the term of this patent is extended or adjusted under 35 U.S.C. 154(b) by 281 days.

(21) Appl. No.: 12/661,363

(22) Filed: Mar. 16, 2010

(65) Prior Publication Data
US 2010/0237575 A1    Sep. 23, 2010

Related U.S. Application Data

(60) Provisional application No. 61/210,266, filed on Mar. 17, 2009.

(51) Int. Cl.
*B62B 3/02* (2006.01)
*B62B 3/04* (2006.01)

(52) U.S. Cl.
USPC ........... 280/42; 280/641; 280/47.29; 414/444

(58) Field of Classification Search
USPC ................. 280/47.131, 47.17, 47.18, 47.24, 280/47.27, 47.29, 47.315, 638, 639, 641, 280/42, 651, 652, 655; 414/444, 445, 446, 414/447, 816
See application file for complete search history.

(56) References Cited

U.S. PATENT DOCUMENTS

| 3,007,710 A | | 11/1961 | Sykes |
| 3,197,226 A | * | 7/1965 | Erlinder ..................... 280/646 |
| 3,363,787 A | * | 1/1968 | Macomber ................. 414/444 |
| 3,807,750 A | | 4/1974 | Brown |
| 3,861,695 A | * | 1/1975 | Shourek et al. ........... 280/5.24 |
| 5,232,232 A | | 8/1993 | Kishi |
| 5,401,043 A | | 3/1995 | Myron |
| 5,513,939 A | * | 5/1996 | Martin et al. .............. 414/447 |
| D395,120 S | | 6/1998 | Newman et al. |
| 6,095,534 A | * | 8/2000 | Wong .......................... 280/42 |
| 6,709,222 B2 | * | 3/2004 | Inman, Jr. .................. 414/490 |
| 6,857,836 B2 | | 2/2005 | Keller |
| D538,998 S | * | 3/2007 | Henry .......................... D34/23 |
| 2003/0025287 A1 | * | 2/2003 | Kady ....................... 280/47.29 |
| 2005/0161915 A1 | | 7/2005 | Landefeld |
| 2008/0203687 A1 | | 8/2008 | Meyers et al. |

FOREIGN PATENT DOCUMENTS

JP        6199241 A    7/1994

* cited by examiner

*Primary Examiner* — John Walters
(74) *Attorney, Agent, or Firm* — Kinney & Lange, P.A.

(57) ABSTRACT

A collapsible dolly is movable between an extended use position and a compact storage position. The dolly has a right leg and a left leg that form a supportive A-frame when fully extended. Hinges and sliding components are capable of collapsing the dolly into a collapsed position for storage and/or transportation.

19 Claims, 10 Drawing Sheets

COLLAPSIBLE DOLLY

CROSS-REFERENCE TO RELATED APPLICATION(S)

This application claims the benefit of U.S. Provisional Pat. App. No. 61/210,266 filed Mar. 17, 2009.

BACKGROUND

The present invention relates to a cart for transporting oversized objects. More particularly, the present invention is a collapsible dolly for transporting large and heavy objects such as, but not limited to, portable toilets.

A hand truck or "dolly" is well known for its usefulness in transporting loads. A dolly can be tailored to meet the needs of a particular industry. For example, U.S. Pat. No. 3,807,750 to Brown discloses a collapsible and adjustable dolly for removing or installing heavy domestic appliances such as ovens and air-conditioners. Similarly, U.S. Pat. No. 6,095,534 assigned to Jasent Inc. and U.S. Pat. No. 5,401,043 to Myron both disclose collapsible luggage carts for transporting luggage through airport terminals. There exists a need for a dolly adapted for transporting portable toilets and other heavy event equipment.

SUMMARY

A collapsible dolly includes a right leg and a left leg, a right fork and a left fork, a handle block, and a handle. The right leg and the left leg, each have a top end and a bottom end. The right fork has a hinged attachment to the bottom end of the right leg and the left fork has a hinged attachment to the bottom end of the left leg. The handle block has a first side pivotally attached to the top ends of both the right leg and the left leg. The handle has a grip and a body extending downwardly from the grip. The handle body is slidably engaged with a second side of the handle block.

A method of transporting a portable toilet includes opening a collapsible dolly from a closed, compact state to an open, extended state, inserting dolly forks under the portable toilet, rocking the dolly back onto dolly wheels so that the portable toilet is supported by the dolly, and transporting the portable toilet from a first location to a second location.

DETAILED DESCRIPTION

Figure 1A:
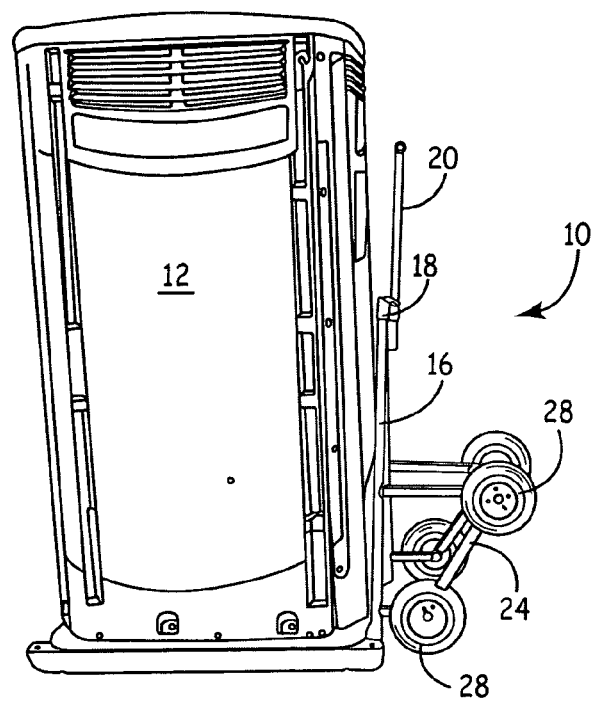
FIG. 1A is a side view and FIG. 1B is a rear view of a collapsible dolly in contact with a portable toilet in accordance with the present invention.
Figure 1B:
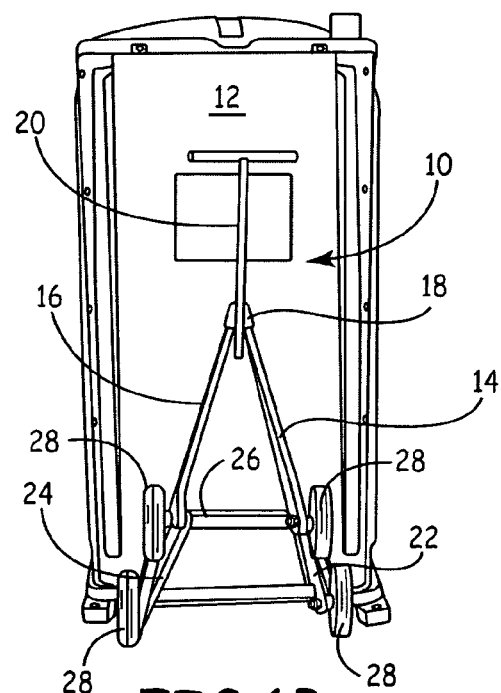

FIG. 1A is a side view and FIG. 1B is a rear view of collapsible dolly 10 in contact with a portable toilet 12. Depicted are collapsible dolly 10, portable toilet 12, right leg 14, left leg 16, handle block 18, handle 20, right brace 22, left brace 24, folding bar 26, and wheels 28. Collapsible dolly 10 is configured to transport heavy and/or large objects such as, but not limited, to portable toilet 12.

Right leg 14 and left leg 16 are attached to handle block 18. Both right leg 14 and left leg 16 extend downwardly and outwardly from handle block 18 to form a supportive A-frame. Also attached to handle block 18, but extending vertically upward in a direction opposite to right leg 14 and left leg 16, is handle 20. Right brace 22 has two attachment points on a backside of right leg 14 such that it forms a U-shape beginning in an approximate middle of right leg 14 and terminating near a bottom of right leg 14. Similarly, left brace 24 has two attachment points on a backside of left leg 16 such that it forms a U-shape beginning in an approximate middle of left leg 16 and terminating near a bottom of right leg 16. Extending between right leg 14 and left leg 16 to attach right brace 22 to left brace 24 is folding bar 26. Wheels 28 are located on right brace 22 and left brace 24. In the embodiment depicted two 10 inch pneumatic wheels 28 are attached to right brace 22 and two 10 inch pneumatic wheels 28 are attached to left brace 24. Collapsible dolly 10 is sized to transport portable toilet 12, although the invention is not so limited.

Right leg 14 and left leg 16 form an A-frame for supporting loads. Handle block 18 or collar contains a top portion of right leg 14 and left leg 16 to form an apex for the A-frame. Handle block 18 also contains a bottom portion handle 20, which is slidably engaged with handle block 18. Right brace 22 and left brace 24 support right leg 14 and left leg 16 such that a substantial load can be placed on the A-frame formed by right leg 14 and left leg 16. Right brace 22 and left brace 24 also provide attachment locations for wheels 28. Collapsible dolly 10 is depicted adjacent portable toilet 12 and is configured to support the weight of portable toilet 12 once tipped backward so that all wheels 28 are in contact with a floor or ground.

Figure 2A:
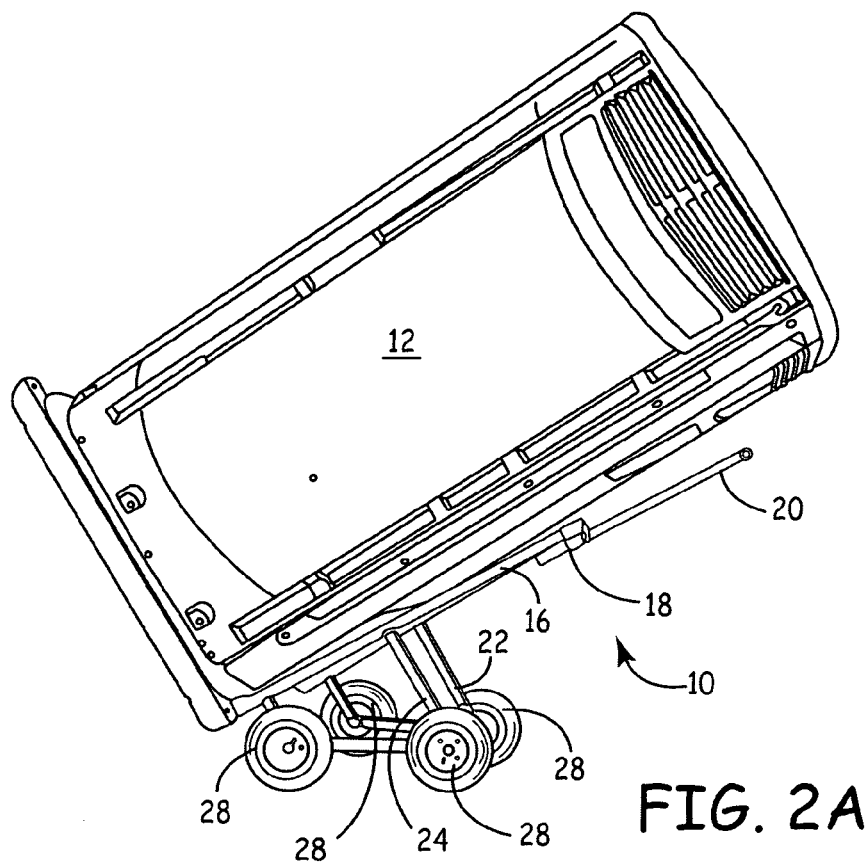
FIG. 2A is a side view and FIG. 2B is a rear view of the collapsible dolly supporting the load of the portable toilet.
Figure 2B:
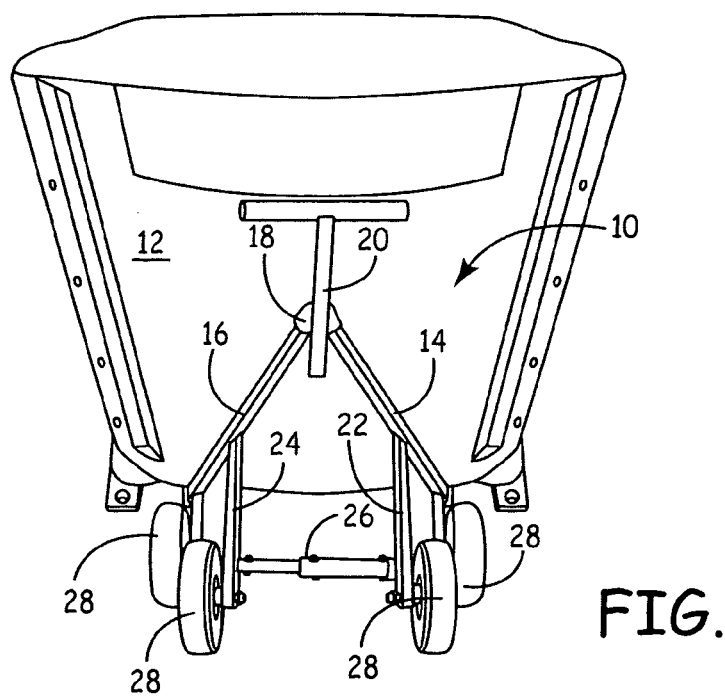

FIG. 2A is a side view and FIG. 2B is a rear view of collapsible dolly 10 supporting the load of portable toilet 12. Depicted are collapsible dolly 10, portable toilet 12, right leg 14, left leg 16, handle block 18, handle 20, right brace 22, left brace 24, folding bar 26, and wheels 28. The arrangement of dolly 10 components and toilet 12 are unchanged from FIGS. 1A & 1B except that dolly 10 is rocked backwards onto all four wheels 28 to support and transport portable toilet 12.

Figure 3:
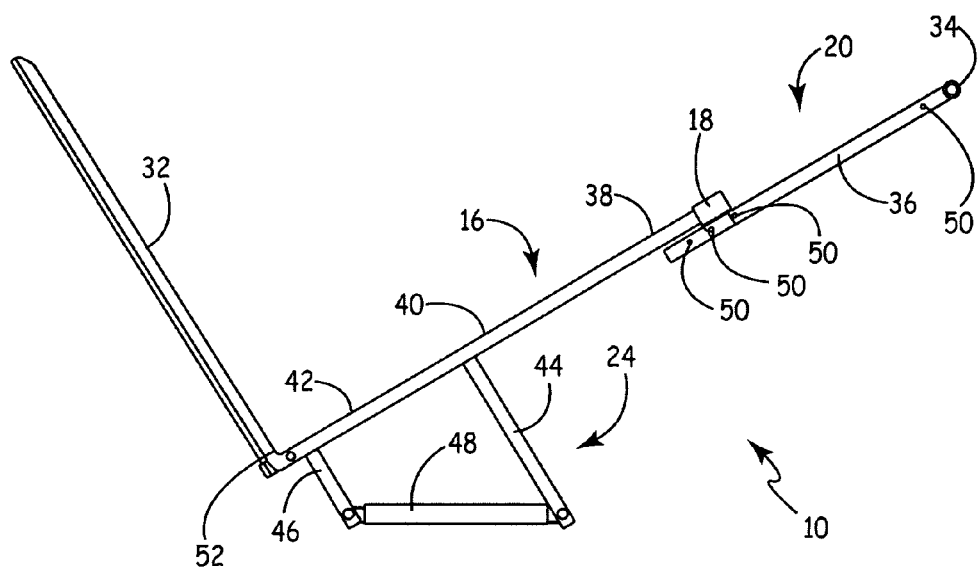
FIG. 3 is a side view of the collapsible dolly (without wheels) in an extended position.

FIG. 3 is a side view of collapsible dolly 10 (without wheels) in an extended position for use in supporting and transporting loads. Depicted are components of collapsible dolly 10 visible from the left side: left leg 16, handle block 18, handle 20, left brace 24, left fork 32, handle grip 34, handle body 36, top left leg 38, center left leg 40, bottom left leg 42, first strut 44, second strut 46, cross brace 48, pin holes 50, and left hinge 52. When fully extended and viewed from the left side, collapsible dolly 10 resembles a backwards letter "L".

The uppermost portion of handle 20 is horizontally extending handle grip 34. Extending vertically downwards from handle grip 34 is handle body 36. A bottom portion of handle body 36 is received by handle block 18. Continuing downwards from handle block 18 is left leg 16. Left leg 16 can be divided into top 38, which is attached to handle block 18, elongated center 40, and bottom 42. As indicated by name, elongated center 40 extends between top 38 and bottom 42. Attached to bottom 42 of left leg 16 is left fork 32. When fully extended, left fork 32 forms an approximately 90° angle with left leg 16. Left brace 24 is U-shaped structure attached to left leg 16 with brackets and pins or any other suitable means of attachment. More specifically, first strut 44 is attached to center 40 of left leg 16 at an approximately 90° angle and second strut 46 is attached near bottom 42 of left leg 16 at an approximately 90° angle. Extending between first strut 44 and second strut 46 is cross brace 48. First strut 44 attaches to cross brace 48 at an approximately 60° angle and second strut 46 attaches to cross brace 48 at an approximately 120° angle. Extending through handle body 36 are a plurality of pin holes 50. In the depicted embodiment, three pin holes 50 are shown near a bottom end of handle body 36 and one pin hole 50 is shown near a top of handle body 36, although more or less pin holes 50 are contemplated. Left hinge 52 attaches bottom 42 of left leg 16 to left fork 32.

Left fork 32 is movable between an extended position where it forms an approximately right angle with the left leg 16 and a collapsed position where left fork 32 lies adjacent and approximately parallel to left leg 16. Left hinge 52 located at the junction of left fork 32 and bottom 42 of left leg 16 allows for left fork 32 to move between the extended and collapsed positions. Handle body 36 is also movable in that it slides upwards and downwards through handle block 18. In FIG. 3, handle 20 is depicted in one of several possible extended positions. Pin holes 50 located along handle body 36 are all possible points of attachment between handle body 36 and handle block 18. In the depicted position, collapsible dolly 10 is configured to support and transport substantial amounts of weight such as, but not limited to, the weight of a portable toilet.

Figure 4:
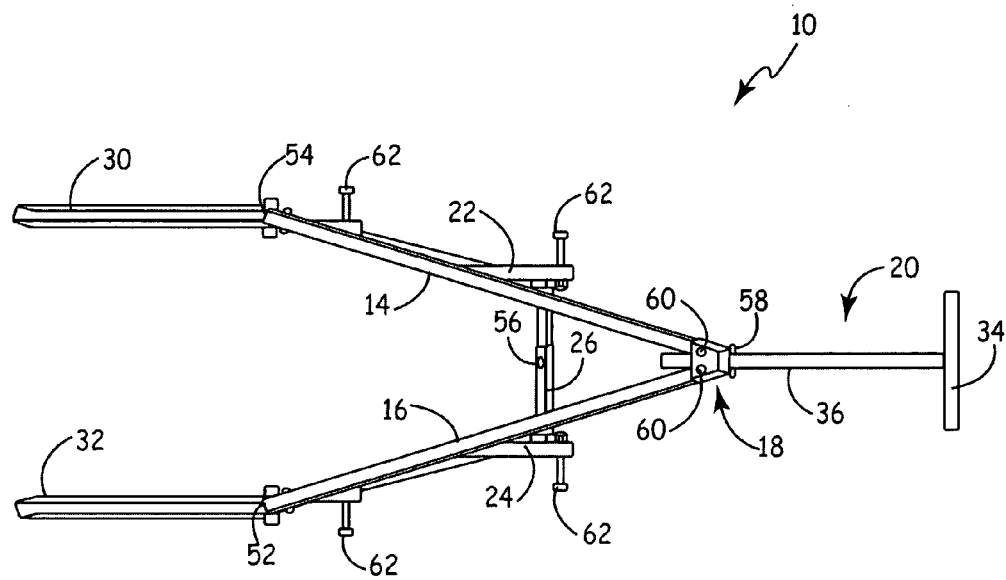
FIG. 4 is a top view of the collapsible dolly (without wheels) in an extended position.

FIG. 4 is a top view of collapsible dolly 10 (without wheels) from FIG. 3. Depicted are the components of collapsible dolly 10 visible from the top: right leg 14, left leg 16, handle block 18, handle 20, right brace 22, left brace 24, folding bar 26, right fork 30, left fork 32, handle grip 34, handle body 36, left hinge 52, right hinge 54, center hinge 56, spring pin 58, screws 60, and truck legs 62. When fully extended and viewed from the top, right leg 14, left leg 16 and folding bar 56 resemble the letter "A".

Handle block 18 is a truncated, triangularly shaped block having a top cover plate. Right leg 14 and left leg 16 extend into a bottom of handle block 18. Vertically extending handle body 36 is attached to an approximate center of horizontally extending handle grip 34 such that handle 20 resembles the letter "T". Spring pin 58 is inserted through one of the plurality of pin holes 50 located along handle body 36. Right fork 30 is attached to right leg 14 by right hinge 54 and left fork 32 is attached to left leg 16 by left hinge 52. Centrally located on folding bar 26 approximately halfway between right brace 22 and left brace 24 is center hinge 56. Securing right leg 14 and left leg 16 to handle block 18 are two screws 60, although more or less screws 60 are possible.

Spring pin 58 secures handle 20 to handle block 18 in either an extended position or a collapsed position. More specifically, spring pin 58 secures handle 20 in one of several extended positions or a collapsed position by restricting movement handle body 36 with respect to handle block 18. Handle body 36 is slid in or out of handle block 18 until handle grip 34 is at a desired height. To secure body 36 at this specific height, spring pin 58 is inserted through the one of pin holes 50 located nearest to a top side of handle block 18. In the embodiment depicted, four pin holes 50 allow for four heights of handle 20 although more or less pin holes 50 are contemplated. Right fork 30 and right hinge 54 operate in the same manner as left fork 32 and left hinge 52 described above. Specifically, right fork 30 unfolds to form an approximately 90° angle with right leg 14 and folds inwards at right hinge 54 to lie adjacent and approximately parallel to right leg 14. Center hinge 56 is depicted in an extended position where right leg 14 and left leg 16 are spaced apart approximately 37° degrees to form the letter "A", but center hinge 56 can be pushed backwards to "break" folding bar 26 into two arms. Once broken at hinge 56, the two arms of folding bar 26 move inwardly toward one another thereby bringing right leg 14 adjacent and approximately parallel to left leg 16. Screws 60 extending through bores in handle block 18 are large enough to allow right leg 14 and left leg 16 to pivot inwardly toward one another and assume their compact position, as well as pivot outwardly away from one another to assume their extended use position. Hinges 52, 54, 56 and spring pin 58 collectively give collapsible dolly 10 the ability to fold inward and assume a compact position ideal for transport and storage.

Figure 5:
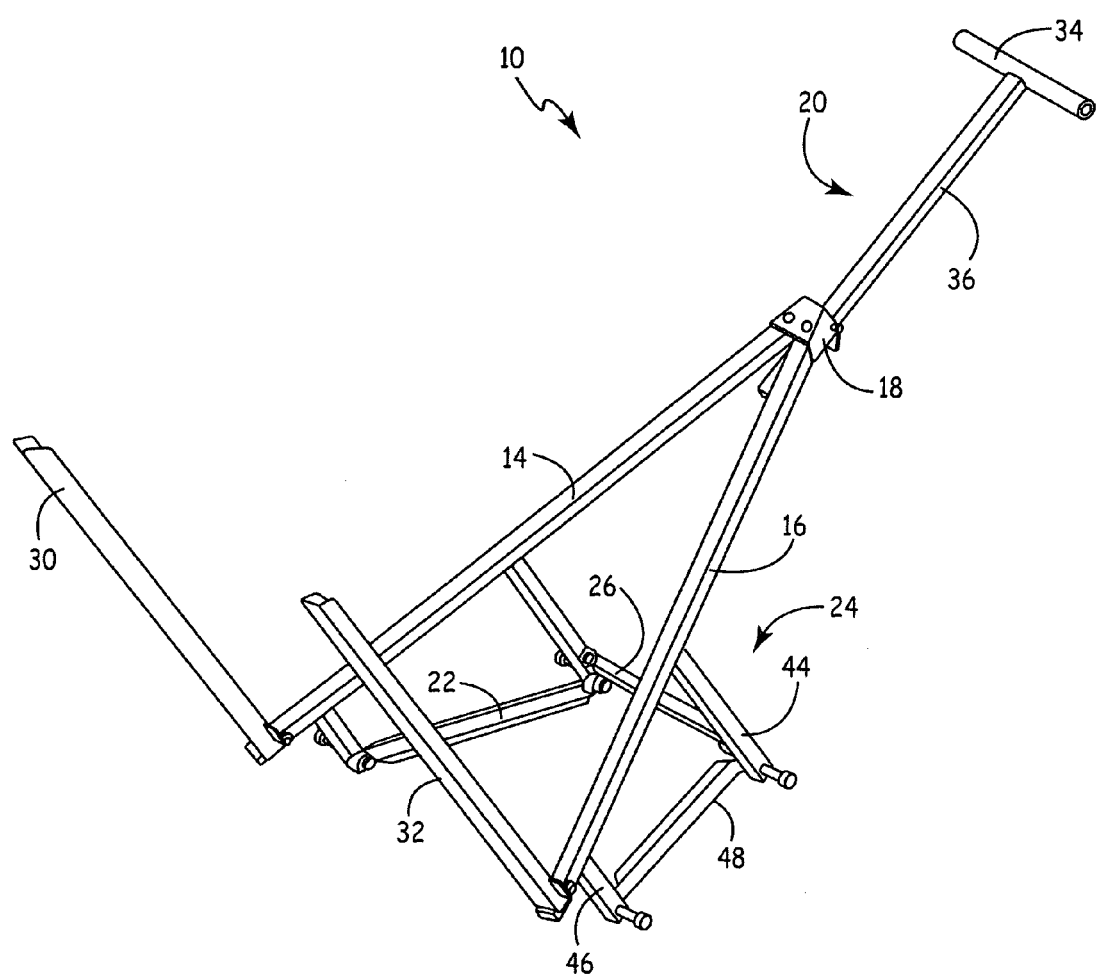
FIG. 5 is a perspective view of the collapsible dolly (without wheels) in an extended position.

FIG. 5 is a perspective view of collapsible dolly 10 (without wheels) from FIG. 2. Depicted are: right leg 14, left leg 16, handle block 18, handle 20, right brace 22, left brace 24, folding bar 26, right fork 30, left fork 32, handle grip 34, handle body 36, first strut 44, second strut 46, and cross brace 48. When fully extended, as depicted in FIG. 5, collapsible dolly 10 is configured to support and transport oversized and/or awkward loads.

The components of collapsible dolly 10 are arranged and functioning as described above with reference to FIGS. 3 & 4. Right leg 14, left leg 16, and handle body 36 can be constructed from squared steel tubes. In the depicted embodiment, right leg 14 and left leg 16 are approximately 45 inches long and handle body 36 is approximately 29 inches long. Handle grip 34 can be constructed from a cylindrical steel tube and have a length of approximately 12 inches. Right brace 22, left brace 24, right fork 30, and left fork 32 can all be constructed from U-channel steel sections. Right brace 22 and left brace 24 should possess the approximately the same dimensions. Namely, first strut 44 can be approximately 17 inches long, second strut 46 can be approximately 7.5 inches long, and cross brace 48 can be approximately 18.5 inches long. Both right fork 30 and left fork 32 can be approximately 43 inches long. The dimensions above are merely exemplary and not to be construed as limiting. So configured, collapsible dolly 10 is sized to support and transport portable toilet 12.

Figure 6:
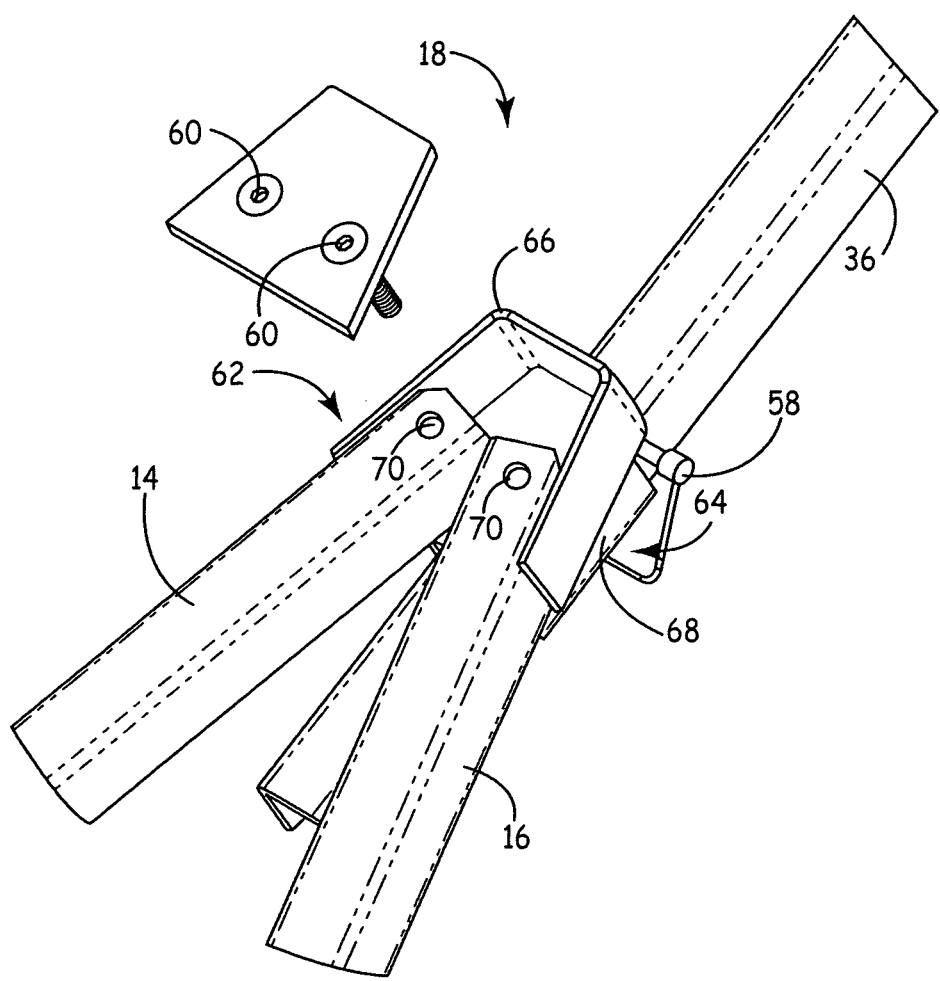
FIG. 6 is a perspective detail view of the handle block from FIG. 5.

FIG. 6 is a perspective detail view of handle block 18 from FIG. 5. Depicted in FIG. 6 are: right leg 14, left leg 16, handle block 18, body 36, retaining pin 58, screws 60, first side 62, second side 64, enclosure 66, sleeve 68, and screw holes 70. Handle block 18 provides for pivotal movement of right leg 14 and left leg 16, as well as sliding movement of body 36 giving collapsible dolly 10 the ability to change its configuration.

Handle block 18 has first side 62 pivotally attached to both right leg 14 and left leg 16 and second side 64 slidably attached to body 36 of handle 20. In the depicted embodiment, handle block 18 is a three-sided enclosure 66 that receives a top end of right leg 14 in a right side of the enclosure 66 and receives a top end of left leg 16 in a left side of enclosure 66. In FIG. 6, a top cover of enclosure 66 is exploded away to show how right leg 14 and left leg 16 are received into enclosure 66, although in practice enclosure 66 can be welded shut. Screws 60 extend through the top portion of enclosure 66 and into holes 70 located on the top ends of legs 14, 16. Opposite first side 62 is second side 64 of handle block 18. Second side 64 includes sleeve 68 for receiving body 36. Retainer pin 58 extends through a pin hole in a lower end of body 36 adjacent a top end of sleeve 68.

Right leg 14 and left leg 16 are pivotally attached to first side 62 of handle block 18. Screws 60 and screw holes 70 secure right leg 14 and left leg 16 to handle block 18, but allow right leg 14 and left leg 16 to pivot inwardly toward one another and outwardly away from one another. When located in an open position (depicted), an acute angle of approximately 30-50 degrees is formed between right leg 14 and left leg 16. When located in a closed position, right leg 14 and left leg 16 are substantially parallel to one another and form little to no angle between themselves. Body 36 of handle 20 is slidably received by second side 64 of handle block 18. Sleeve 68 is configured to receive body 36 so that body 36 can slide upwardly out of handle block 18 and downwardly into handle block. Retainer pin 58 is inserted through a pin hole in body 36 to secure body 36 extending out of sleeve 68 at predetermined height. Handle block 18 is designed for pivotal attachment of right leg 14 and left leg 16, as well as sliding attachment of body 36, so that these components of collapsible dolly 10 can change positions from an open use position to a closed storage position.

Figure 7A:
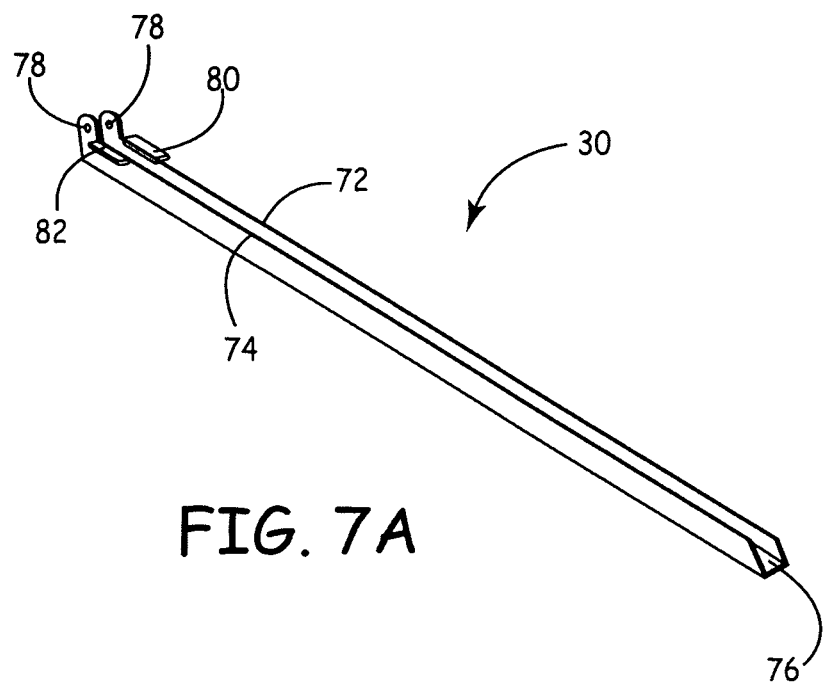
FIGS. 7A and 7B are a perspective detail views of the right and left forks, respectively, from FIG. 5.
Figure 7B:
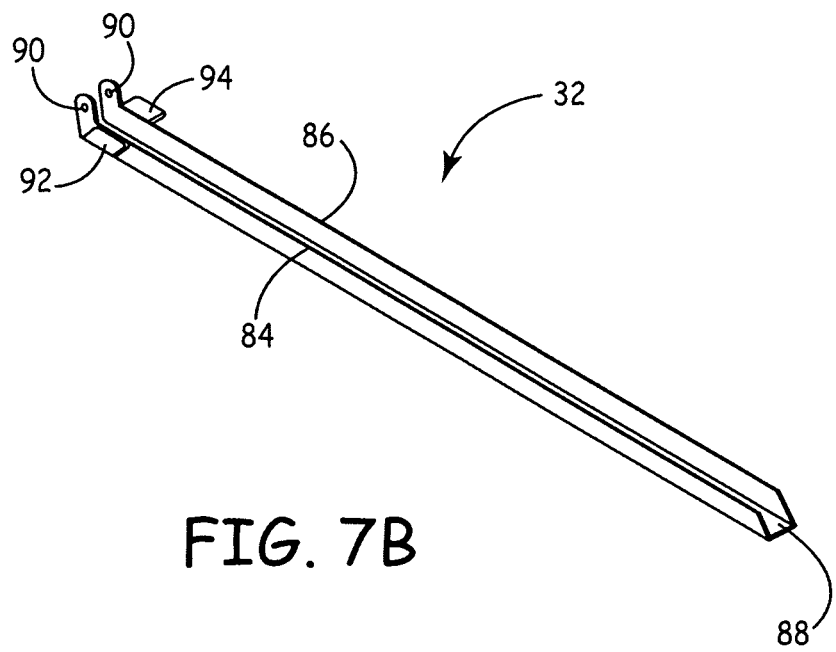

FIGS. 7A and 7B are perspective detail views of right fork 30 and left fork 32, respectively. Depicted in FIG. 7A are the components of right fork 30: outside wall 72, inside wall 74, floor 76, attachment points 78, outside wing 80, and inside wing 82. Depicted in FIG. 7B are the components of left fork 32: outside wall 84, inside wall 86, floor 88, attachment points 90, outside wing 92, and inside wing 94. Right fork 30 and left fork 32 are mirror images of one another and will be described together where appropriate.

In the depicted embodiment, each fork 30, 32 forms a U-shaped channel defined by outside wall 72/84, inside wall 74/86, and floor 76/88. Outside wall 72/84 extends upwardly from an outside edge of floor 76/88 and inside wall 74/86 extends upwardly from a inside edge floor 76/88. Thus, outside wall 72 of right fork 30 faces outwardly in a direction away from left fork 32 and likewise, outside wall 84 of left fork 32 faces outwardly in a direction away from right fork 30. In opposition, inside wall 74 of right fork 30 and inside wall 86 of left fork face inwardly toward one another. At a first end of both outside wall 72/84 and inside wall 74/86 are attachment points 78/90 for attaching fork 30/32 to leg 14/16. Located adjacent to attachment points 78/90 are outside wing 80/92 and inside wing 82/94. Outside wing 80/92 extends outwardly from a top of outside wall 72/84 and inside wing 82/94 extends inwardly from a top of inside wall 74/86.

Right fork 30 and left fork 32 are configured to support substantial loads. Outside wings 80, 92 and inside wings 82, 94 provide a greater top surface for forks 30, 32 to accomplish this purpose. Outside wings 80, 92 and inside wings 82, 94 also ensure at least four contact points between collapsible dolly 10 and an objected to be transported, such as but not limited to, a portable toilet (See FIGS. 2A-2B). The robust design of forks 30, 32 extends the useful lifespan of collapsible dolly for transporting heavy and/or large objects.

Figure 8A:
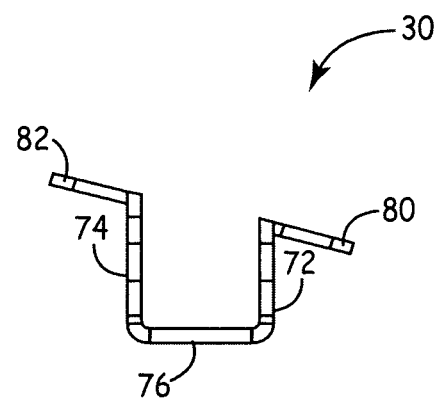
FIGS. 8A and 8B are cross-sections of the right and left forks, respectively, from FIGS. 7A and 7B.
Figure 8B:
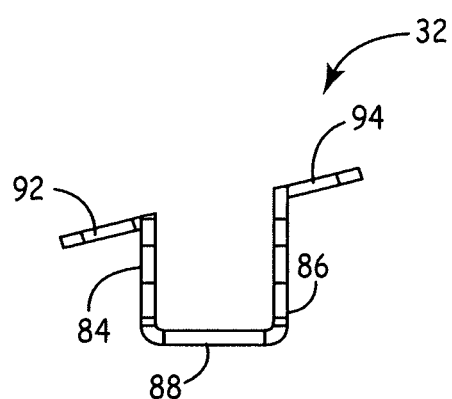

FIGS. 8A and 8B are cross-sections of right fork 30 and left fork 32, respectively. Depicted in FIG. 8A are the components of right fork 30: outside wall 72, inside wall 74, floor 76, outside wing 80, and inside wing 82. Depicted in FIG. 8B are the components of left fork 32: outside wall 84, inside wall 86, floor 88, outside wing 92, and inside wing 94. The cross-sections of FIGS. 8A and 8B show how right fork 30 and left fork 32 are configured to support a heavy load transported by collapsible dolly 10.

Outside wing 80/92 and inside wing 82/94 can be formed by bending down a top portion of outside wall 72/84 and inside wall 74/86, respectively. The remaining portion of outside wall 72/84 forms an acute angle with outside wing 80/92 and the remaining portion of inside wall 74/86 forms an obtuse angle with inside wing 82/94. More specifically, outside wall 72/84 and outside wing 80/92 form an angle of about 70-80 degrees and inside wall 74/86 and inside wing 82/94 form an angle of about 100-110 degrees. Inside wall 74/86 is taller than outside wall 72/84 in that it extends vertically further away from floor 76/88. Thus, inside wing 82/94 and outside wing 80/92 form a tilted platform for receiving a heavy object onto collapsible dolly 10.

Figure 9:
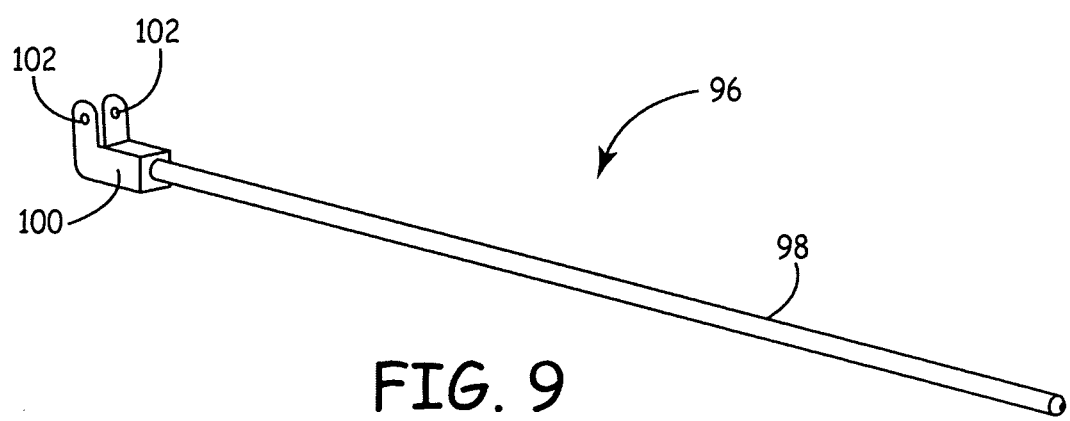
FIG. 9 is a perspective detail view of an alternative embodiment of a fork.

FIG. 9 is a perspective detail view of an alternative embodiment of rounded fork 96. Depicted in FIG. 9 are components of rounded fork 96: rod 98, block 100, and attachment points 102. In this alternative embodiment, two rounded forks 96 replace right fork 30 and left fork 32.

Unlike right fork 30 and left fork 32, rounded fork 96 is symmetrical. Rounded fork 96 is characterized by rod 98. Rod 98 is circular in cross section and may include a pointed tip. Rod 98 is attached to, and extending from, block 100. Block 100 is substantially square and includes a relatively flat top surface for distributing load. Extending upwardly from the top surface of block 100 are attachment points 102 for attaching rounded fork 96 to right leg 14 and left leg 16 of collapsible dolly 10.

Although rounded forks 96 are structurally different than U-shaped right fork 30 and left fork 32, rounded forks 96 function substantially the same as right fork 30 and left fork 32. Block 100 essentially replaces outside wings 80, 92 and inside wings 82, 94 as described above with reference to FIGS. 7A-8B, in that block 100 distributes a load to be carried by collapsible dolly 10. Attachment points 102 are similar to attachment points 78 and 90 described above with reference to FIGS. 7A and 7B, in that attachment points 102 attach rounded fork 96 to left leg 14 and right leg 16. Since rounded forks 96 are symmetrical, two identical rounded forks 96 are attached to collapsible dolly 10.

Figure 10A:
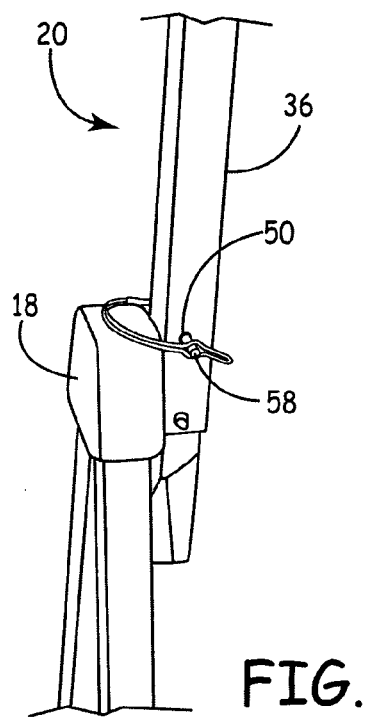
FIGS. 10A-10D are a series of views showing a dolly collapsing into a compact position in accordance with the present invention.
Figure 10B:
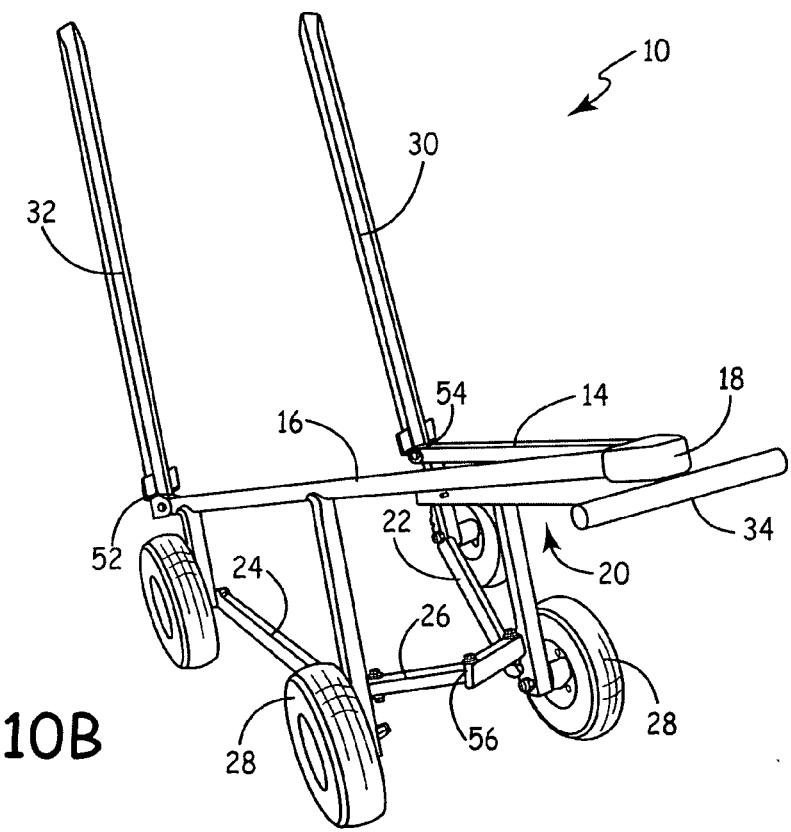
Figure 10C:
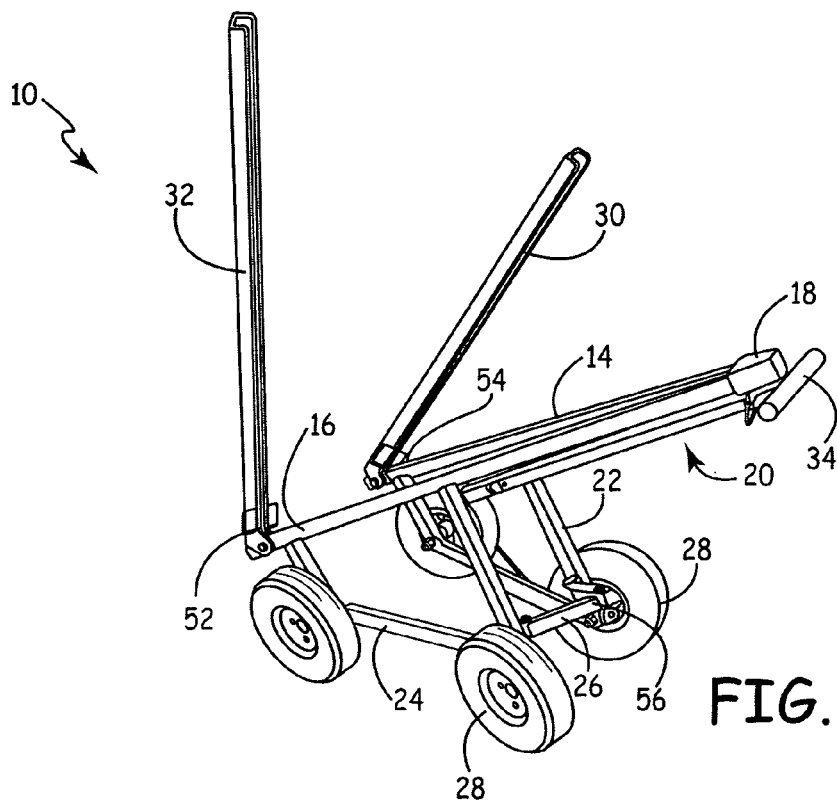
Figure 10D:
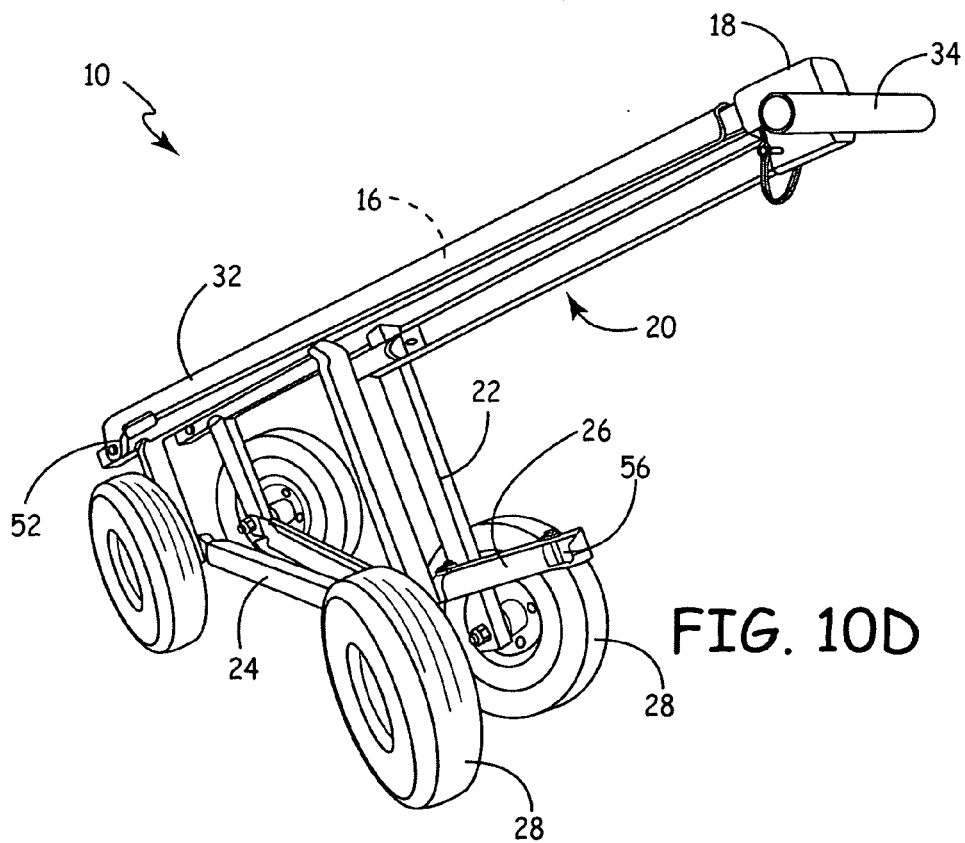

FIGS. 10A-10D are a series showing collapsible dolly 10 collapsing into a compact position for storage. FIG. 10A is a close-up view depicting handle block 18, handle 20, handle body 36, pin hole 50, and spring pin 58. FIGS. 10B-10D are perspective views depicting right leg 14, left leg 16, handle block 18, right brace 22, left brace 24, folding bar 26, wheels 28, right fork 30, left fork 32, handle grip 34, left hinge 52, right hinge 54, and center hinge 56. Viewed in sequence, FIGS. 10A-10D show how one collapses dolly 10 from an extended use position to a collapsed storage position. The reverse is also true, FIG. 10D-10A show how one extends dolly 10 from a collapsed storage position to an extended use position.

The description above with reference to FIGS. 1-9 all depict collapsible dolly 10 in a fully extended position for use in supporting and transporting loads. FIGS. 10A-10D depict how collapsible dolly 10 can be folded to significantly reduce its size. In FIG. 10A, spring pin 58 is inserted through pin hole 50 on handle body 36 adjacent handle block 18. Removal of spring pin 58 from pin hole 50 near a bottom of handle body 36 allows gravity to pull handle body 36 downwards through handle block 18. After handle body 36 ceases downward movement, spring pin 58 is inserted through pin hole 50 near a top of handle body 36 to retain handle 20 in a compact storage position. In FIG. 10B, handle 20 is depicted in this compact storage position. Also in FIG. 10B, center hinge 56 of folding bar 26 is pushed backwards or "broken" such that it is hinging inwards and pulling right brace 22 closer to left brace 24, as well as right leg 14 closer to left leg 16. Center hinge 56, therefore, causes collapsible dolly 10 to collapse about a central axis, much like a child's stroller. In FIG. 10C, right fork 30 is hinging inwards at right hinge 54 toward right leg 14. Similarly, left fork 32 is capable of hinging inwards at left hinge 52 toward left leg 16. After right fork 30 and left fork 32 are adjacent right leg 14 and left leg 16, respectively, dolly 10 is tilted either toward right leg 14 or left leg 16 to fold hinge 56 of folding bar 16 thereby decreasing the distance between right leg 14 and left leg 16. FIG. 10D shows collapsible dolly 10 in its compact storage position where center hinge 56, right hinge 54, and left hinge 52 have completed their respective hinging movements. In this collapsed orientation, center hinge 56 has brought right leg 14 next to left 16 and right brace 22 next to left brace 24. Right fork 30 is in contact with and substantially parallel to right leg 14, and left fork 32 is in contact with and substantially parallel to left leg 16. Furthermore, handle 20 is located between right leg 14 and left leg 16. There is no correct or incorrect order in which the steps of folding collapsible dolly 10 should be completed, and the above description is intended to be merely exemplary. The collapsed position of collapsible dolly 10 takes up significantly less space than the extended position and therefore, eases storage and transport needs.

In reverse order, FIGS. 10D-10A depict how collapsible dolly 10 is unfolded from the collapsed storage position to the extended use position. FIG. 10D shows collapsible dolly 10 in its fully collapsed storage position. In FIG. 10C, dolly 10 has been rolled backwards a few feet to begin the opening process. Rolling dolly 10 backwards causes center 56 of folding bar 26 to open a bit thereby increasing a distance between right leg 14 and left leg 16. Further extension of center hinge 56 occurs by pushing directly on center hinge 56. Forward force unhinges center hinge 56 and further increases the distance between right leg 14 and left leg 16, as well as pushes right brace 22 and left brace 24 apart. Pulling outwards on right fork 30 causes right fork 30 to unhinge at right hinge 54 and move away from right leg 14. Similarly; pulling back on left fork 32 causes left fork 32 to unhinge at left hinge 52 and move away from left leg 16. FIG. 10B shows collapsible dolly in an intermediate position between the collapsed storage position and the extended use position. Right fork 30 is almost fully extended so that it forms an approximately right angle with right leg 14 and left fork 32 is almost fully extended so that is forms an approximately right angle with left leg 16. Center hinge 56 can still be pushed further forward so that right leg 14 and left leg 16 are fully extended and locked out to form an A-frame and right brace 22 and left brace 24 are fully spaced apart. Lastly, pulling upwardly on handle grip 34 causes handle body 36 to extend out through handle block 18. In FIG. 10A, insertion of spring pin 58 into pin hole 50 secures handle 20 into an extended use position. Just as with collapsing, the steps of extending of dolly 10 from a collapsed position to an extended position can be performed in any order.

Collapsible dolly 10 is movable between an extended use position and a collapsed storage position. The extended use position is configured for supporting and transporting portable toilets and the like on collapsible dolly 10. The collapsed storage position is configured for storage and transportation of collapsible dolly 10. Although the present invention has been described with reference to preferred embodiments, workers skilled in the art will recognize that changes may be made in form and detail without departing from the spirit and scope of the invention.

The invention claimed is:

1. A collapsible dolly comprising:
   a right leg and a left leg, each leg having a top end and a bottom end;
   a right fork and a left fork, the right fork having a hinged attachment to the bottom end of the right leg and the left fork having a hinged attachment to the bottom end of the left leg, wherein the right fork and the left fork are both U-shaped in cross section, each fork having an outside wall, an inside wall, and a recessed channel extending between the outside wall and the inside wall, and wherein the inside walls extend upwardly further from the recessed channel so that the inside walls are taller than the outside walls;
   a handle block having a first side and a second side, the first side pivotally attached to the top ends of both the right leg and the left leg; and
   a handle having a grip and a body extending downwardly from the grip, the body slidably engaged with the second side of the handle block.

2. The collapsible dolly of claim 1, and further comprising:
   a right brace structure connected to the right leg;
   a first right wheel mounted on the right brace structure near the bottom end of the right leg;
   a second right wheel mounted on the right brace structure between the bottom end and the top end of the right leg and farther from the right leg than the first right wheel;
   a left brace structure connected to the left leg;
   a first left wheel mounted on the left brace structure near the bottom end of the left leg; and
   a second left wheel mounted on the left brace structure between the bottom end and the top end of the left leg and farther from the left leg than the first left wheel.

3. The collapsible dolly of claim 2, wherein the first side of the handle block further comprises an enclosure for receiving and enclosing the top ends of both the right leg and the left leg.

4. The collapsible dolly of claim 3, further comprising:
   a left screw extending through the enclosure and the top end of the left leg securing the left leg to the handle block; and
   a right screw extending through the enclosure and the top end of the right leg securing the right leg to the handle block;
   wherein the left screw and right screw allow the left leg and right leg, respectively, to pivot within the enclosure between an open position and a closed position.

5. The collapsible dolly of claim 4, wherein the open position is defined by the right leg and the left leg forming an acute angle.

6. The collapsible dolly of claim 5, wherein the closed position is defined by the right leg and the left leg being substantially parallel to one another.

7. The collapsible dolly of claim 2, wherein the second side of the handle block further comprises a sleeve for receiving the body of the handle.

8. The collapsible dolly of claim 7, wherein a plurality of holes extend through a lower end of the body of the handle.

9. The collapsible dolly of claim 8, further comprising a retaining pin extending through one of the plurality of holes for securing the body to the sleeve at a predetermined height.

10. The collapsible dolly of claim 2, wherein the right fork and the left fork are rod-shaped.

11. The collapsible dolly of claim 1, further comprising:
   outside wings extending outwardly from the outside walls; and
   inside wings extending inwardly from the inside walls.

12. The collapsible dolly of claim 11, wherein the outside wings extend in an acute angle from the outside walls and the inside wings extend in an obtuse angle from the inside walls.

13. The collapsible dolly of claim 12, wherein the outside wings and the inside wings are located adjacent the hinged attachment between the forks and the legs.

14. A method of transporting a portable toilet, the method comprising:
    opening a collapsible dolly from a closed, compact state to an open, extended state;
    inserting dolly forks under the portable toilet;
    rocking the dolly back onto a set of four dolly wheels so that the portable toilet is supported in an inclined position by the dolly; and
    transporting the portable toilet from a first location to a second location by rolling the dolly on the set of four dolly wheels; wherein the collapsible dolly comprises:
        a right leg and a left leg, each leg having a top end and a bottom end;
        a right fork and a left fork, the right fork having a hinged attachment to the bottom end of the right leg and the left fork having a hinged attachment to the bottom end of the left leg, wherein the right fork and the left fork are both U-shaped in cross section, each fork having an outside wall, an inside wall, and a recessed channel extending between the outside wall and the inside wall, and wherein the inside walls extend upwardly further from the recessed channel so that the inside walls are taller than the outside walls;
        a handle block having a first side and a second side, the first side pivotally attached to the top ends of both the right leg and the left leg; and
        a handle having a grip and a body extending downwardly from the grip, the body slidably engaged with the second side of the handle block.

15. The method of claim 14, further comprising:
    rocking the dolly forward so that the portable toilet is no longer supported by the dolly;
    removing the dolly forks from under the portable toilet;
    closing the dolly from the open, extended state to the closed, compact state.

16. The method of claim 14, wherein opening the collapsible dolly further comprises:
    rolling the collapsible dolly backwards thereby increasing distance between a left side of the dolly and a right side of the dolly;
    unhinging a center hinge located between the two of the four wheels to further the distance between the left and right sides;
    unfolding dolly forks away from the left and right side of the dolly;
    extending a handle away from the left and right side of the dolly; and
    securing the handle in an extended position.

17. The method of claim 16, wherein closing the dolly further comprises:
    hinging the center hinge thereby decreasing distance between a left side of the dolly and a right side of the dolly;
    folding dolly forks toward the left and right side of the dolly;
    releasing the handle toward the left and right side of the dolly;
    securing the handle in a compact position; and
    tilting the dolly to one side further decreasing the distance between the left and right sides.

18. The method of claim 17, wherein securing the handle includes inserting a pin through a hole located on the handle.

19. The method of claim 16, wherein securing the handle includes inserting a pin through a hole located on the handle.

* * * * *